(12) United States Patent
Okajima et al.

(10) Patent No.: US 7,721,719 B2
(45) Date of Patent: May 25, 2010

(54) FUEL ACTIVATION APPARATUS FOR METHANE GAS

(75) Inventors: Satoshi Okajima, Musashino (JP); Seitaro Takahashi, Abiko (JP); Masahiro Ito, Fujimi (JP)

(73) Assignee: Fire Up Ltd., Tokyo (JP)

( * ) Notice: Subject to any disclaimer, the term of this patent is extended or adjusted under 35 U.S.C. 154(b) by 385 days.

(21) Appl. No.: 11/884,370

(22) PCT Filed: Feb. 16, 2006

(86) PCT No.: PCT/JP2006/302719
§ 371 (c)(1),
(2), (4) Date: Oct. 19, 2007

(87) PCT Pub. No.: WO2006/088084
PCT Pub. Date: Aug. 24, 2006

(65) Prior Publication Data
US 2009/0206276 A1  Aug. 20, 2009

(30) Foreign Application Priority Data
Feb. 16, 2005  (JP)  ............................. 2005-038884

(51) Int. Cl.
*F23K 5/08* (2006.01)
*B01J 19/08* (2006.01)
*F02M 27/04* (2006.01)
(52) U.S. Cl. .................. 123/538; 123/536; 250/435

(58) Field of Classification Search ............. 250/435; 123/536, 538
See application file for complete search history.

(56) References Cited

U.S. PATENT DOCUMENTS 6,082,339 A * 7/2000 Wey ............................ 123/538
2005/0199541 A1* 9/2005 Jheng ........................ 210/435
2005/0207949 A1* 9/2005 Hasegawa ................ 422/186.3

FOREIGN PATENT DOCUMENTS

JP 11-200964 A 7/1999
JP 2001-355524 A 12/2001
JP 2004-3699 A 1/2004

* cited by examiner

*Primary Examiner*—Jack I Berman
(74) *Attorney, Agent, or Firm*—Kubovcik & Kubovcik

(57) ABSTRACT

There is provided a far infrared radiator capable of highly activating methane gas prior to combustion to thereby attain an enhancement of thermal efficiency at combustion. In a passage of methane gas prior to combustion, there is positioned absorbent material (58) produced by mixing at least carbon with tourmaline as an absorption material of absorptivity higher than that of the material of the methane gas passage. Energy-absorbing coating (59) is applied to an fixed on the external surface of the absorbent material, and on a circumferential surface of the energy-absorbing coating there are positioned magnet (54) and far infrared radiator (57) produced by mixing tourmaline with at least iron powder and carbon.

6 Claims, 4 Drawing Sheets

FUEL ACTIVATION APPARATUS FOR METHANE GAS

This application is a 371 of international application PCT/JP2006/302719, filed Feb. 16, 2006, which claims priority based on Japanese patent application No. 2005-038884 filed Feb. 16, 2005, which is incorporated herein by reference.

TECHNICAL FIELD

The present invention relates to a fuel activation apparatus for methane gas, and more particularly to a fuel activation apparatus for activating methane gas just before its combustion part to thereby attain an enhancement of thermal efficiency of methane gas at combustion.

BACKGROUND ART

A variety of studies have been conducted on enhancement of thermal efficiency of combustors. If thermal efficiency at combustion is increased by 5%, it will become possible to cut back on fuel as a natural resource and fuel costs by 5% every month, leading to significant industrial advantages.

Therefore, there have been improved burners such as the invention described in JP 11-1707 A, for example.

On the other hand, some heaters among combustors were provided with a far infrared radiator for enhancement of heating efficiency. For example, as described in JP 2003-336811 A, an external glass cylinder is provided around a red heat section, a far infrared radiation is emitted from the heated external glass cylinder, and good heating can be thus obtained.

However, the far infrared radiation used here is associated with the heating of a far infrared radiator emitting an infrared radiation, and has been used exclusively for warming the body.

Patent Document 1: JP 11-1707 A
Patent Document 2: JP 2003-336811 A

DISCLOSURE OF THE INVENTION

The inventors of the present invention considered an enhancement of thermal efficiency at combustion by activating methane gas just before its combustion part by a radiation wave from a far infrared radiation.

More specifically, among radiation waves from a far infrared radiation, electromagnetic energy of a certain wave range involved only in vibration and rotation is given to methane molecules, whereby the methane molecules are spun to more vigorously accelerate the rotational and vibratory motions of the methane molecules as well as active chemical species as a combustion precursor emanating the methane molecules. Consequently, energy of collision with oxygen molecules in air is enhanced, the collision frequency is increased, and resultantly, a combustion reaction can be promoted to induce a rise in flame temperature.

Therefore, attention was first given to tourmaline emitting a far infrared radiation, and experiments ware conducted by applying a far infrared radiation from tourmaline to methane gas just before its combustion cart, but an enhancement of thermal efficiency at combustion was not observed.

Examinations of this result showed that, by applying a radiation wave from a far infrared radiator consistent with the absorption band of methane gas, methane gas just before its combustion part could be activated by a far infrared radiation.

Thus, it is an object of the present invention to provide a far infrared radiator capable of highly activating methane gas just before its combustion part to thereby attain an enhancement of thermal efficiency at combustion.

For solving the problem described above, the first invention of the present invention is characterized in that, in a passage of methane gas just before its combustion part, there is positioned a far infrared radiator produced by mixing 300 to 450 weight part of iron powder and 1 to 12 weight part of carbon with 175 to 600 weight part of tourmaline.

Moreover, the second invention is characterized in that silicon is further mixed with the far infrared radiator of the first invention.

The third invention is characterized in that a magnet is placed on the circumference of the far infrared radiator of the first or second invention.

The fourth invention is characterized in that, in a passage of methane gas just before its combustion part, there is positioned an energy-absorbing coating comprising a primer formed as a mixture of tourmaline and carbon with resin applied to the passage and a coating formed as a mixture of tourmaline and carbon with resin applied to an outer surface of the primer, and that, around the energy-absorbing coating, there is positioned a far infrared radiator comprising an energy sheet formed as a mixture of tourmaline, iron powder and carbon with resin and a magnet.

The fifth invention is characterized in that a combustion part is included as the methane gas passage of the fourth invention.

The first invention enhances the effective utilization heat quantity of methane gas in the total heat quantity by activating methane gas just before its combustion part by positioning, in a passage of methane gas just before its combustion part, a far infrared radiator produced by mixing 300 to 450 weight part of iron powder and 1 to 12 weight part of carbon with 175 to 600 weight part of tourmaline.

The second invention further enhances the effective utilization heat quantity of methane gas in the total heat quantity as compared to the first invention by using a far infrared radiator produced by mixing silicon with tourmaline and iron powder.

The third invention further enhances the effective utilization heat quantity of methane gas in the total heat quantity by activating methane gas by a magnetic force from a magnet in addition to the effect of the first or second invention.

The fourth invention enhances the effective utilization heat quantity of methane gas in the total heat quantity by further activating methane gas just before its combustion part by positioning, in a passage of methane gas just before its combustion part, there is positioned an energy-absorbing coating comprising a primer formed as a mixture of tourmaline and carbon with resin applied to the passage and a coating formed as a mixture of tourmaline and carbon with resin applied to an outer surface of the primer, and that, around the energy-absorbing coating, there is positioned a far infrared radiator comprising an energy sheet formed as mixture of tourmaline, iron powder and carbon with resin and a magnet.

Moreover, the fifth invention activates methane gas prior to or during combustion by including a combustion part as a passage of methane gas in addition to the effect of the fourth invention.

BEST MODE FOR CARRYING OUT THE INVENTION

The first example of the present invention will be described below.

First, the experiments described below were conducted.
Fuel used: city gas (13A)
$CH_4$: 88.0%
$C_2H_6$: 5.8%
$C_3H_8$: 4.5%
$C_4H_{10}$: 1.7%
Flame type: jet diffusion flame
Flow rate of fuel: 73 cm/s
Flow rate of air: 27 cm/s
Initial conditions: room temperature, atmospheric pressure (0.1 MPa)

Figure 1:
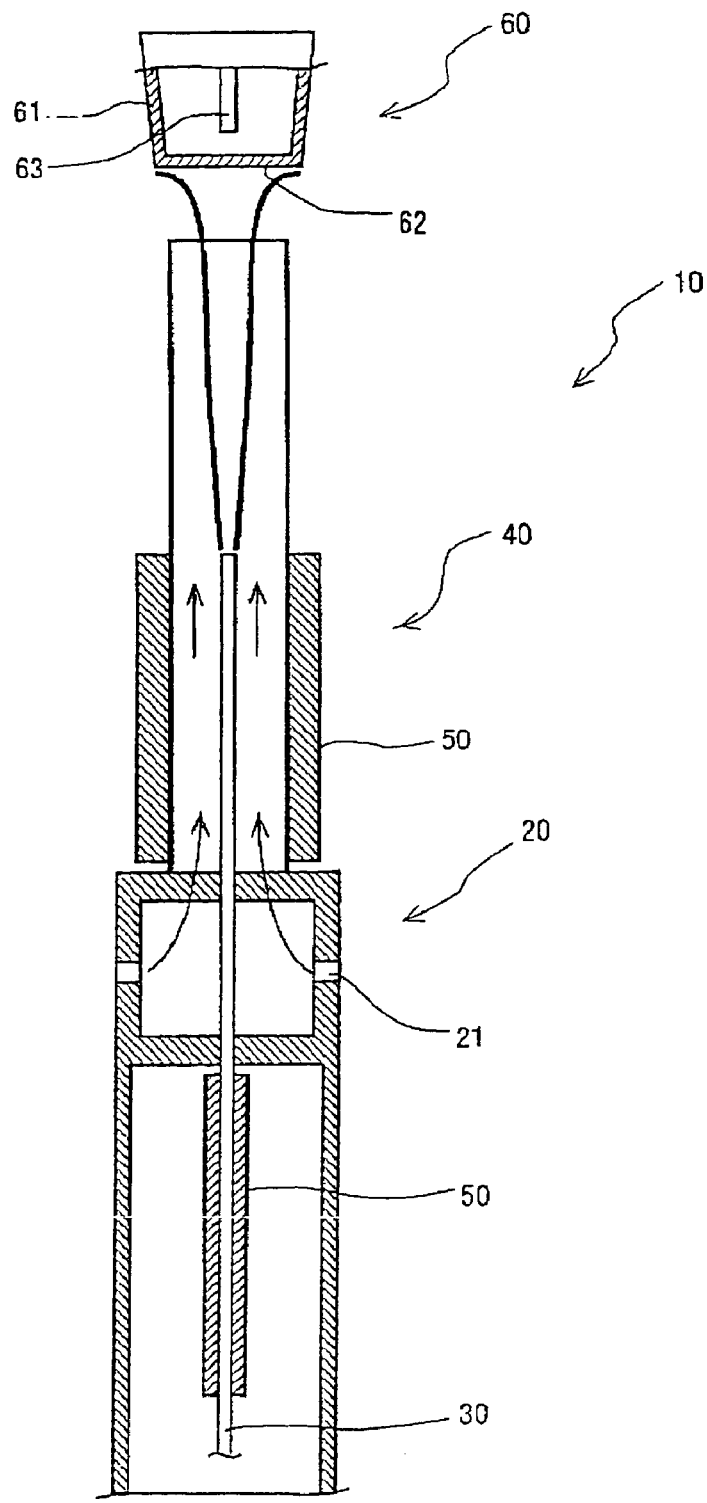
FIG. 1 A schematic diagram of a temperature-rise-measuring apparatus.

A rise in temperature was measured by a measuring apparatus 10 shown in FIG. 1 under the conditions described above.

The measuring apparatus 10 comprises a joint section 20, a fuel pipe 30 fixed on the joint section 20, and a burner section 40, wherein air holes 21 are provided in the joint section 20, and fuel from the fuel pipe 30 and air from the air holes 21 are mixed together to be burnt in the burner section 40.

Moreover, a far infrared radiator 50 is mounted before the fuel pipe 30 and the combustion part of the burner section 40.

Then, at a position that the combustion flame in the burner reaches is positioned a temperature-rise-measuring apparatus 60. The temperature-rise-measuring apparatus 60 is formed as a cylindrical barrel 61 of 120ϕ in its entirety, wherein one surface of the barrel 61 is a flame surface 62 contacted by the flame, and a thermocouple 63 is provided away from the flame surface 62 to measure the temperature of an inside of the barrel 61.

Then, a rise in temperature per unit time of the inside of the barrel 61 was measured for the following samples:

Sample 0: far infrared radiator absent; magnet absent.
Sample 1: far infrared radiator absent; magnet present.
Sample 2: with only tourmaline present; magnet present.
Sample 3: tourmaline+iron powder present; magnet present (tourmaline 50 g, iron powder 110 g).
Sample 4: tourmaline+carbon present; magnet present (tourmaline 50 g, carbon 4 g).
Sample 5: tourmaline+silicon present; magnet present (tourmaline 50 g, black silica 30 g).
Sample 6: tourmaline+iron powder+carbon present; magnet present (tourmaline 50 g, iron powder 110 g, carbon 4 g).
Sample 7: tourmaline+iron powder+silicon present; magnet present (tourmaline 50 g, iron powder 110 g, black silica 30 g)

Each sample described above was mixed with 90% by weight of urethane resin based on the total weight, and then shaped into the same size as a sample.

Then, the rate of rise in temperature $S_n$ was measured for each of samples 0 and 1.

The results are as follows:
Sample 0: $S_0$=4.09° C./min.
Sample 1: $S_1$=4.20° C./min.

From the results, it has been found that only an addition of the magnet increases the rate of rise in temperature $S_n$.

It is considered that ionized active chemical species produced by thermal cracking of methane and the like in a combustion base by a magnetic field formed by the magnet further increased its reaction energy so as to induce a slight rise in flame temperature, whereby the rate of rise in temperature $S_n$ was enhanced.

Figure 2:
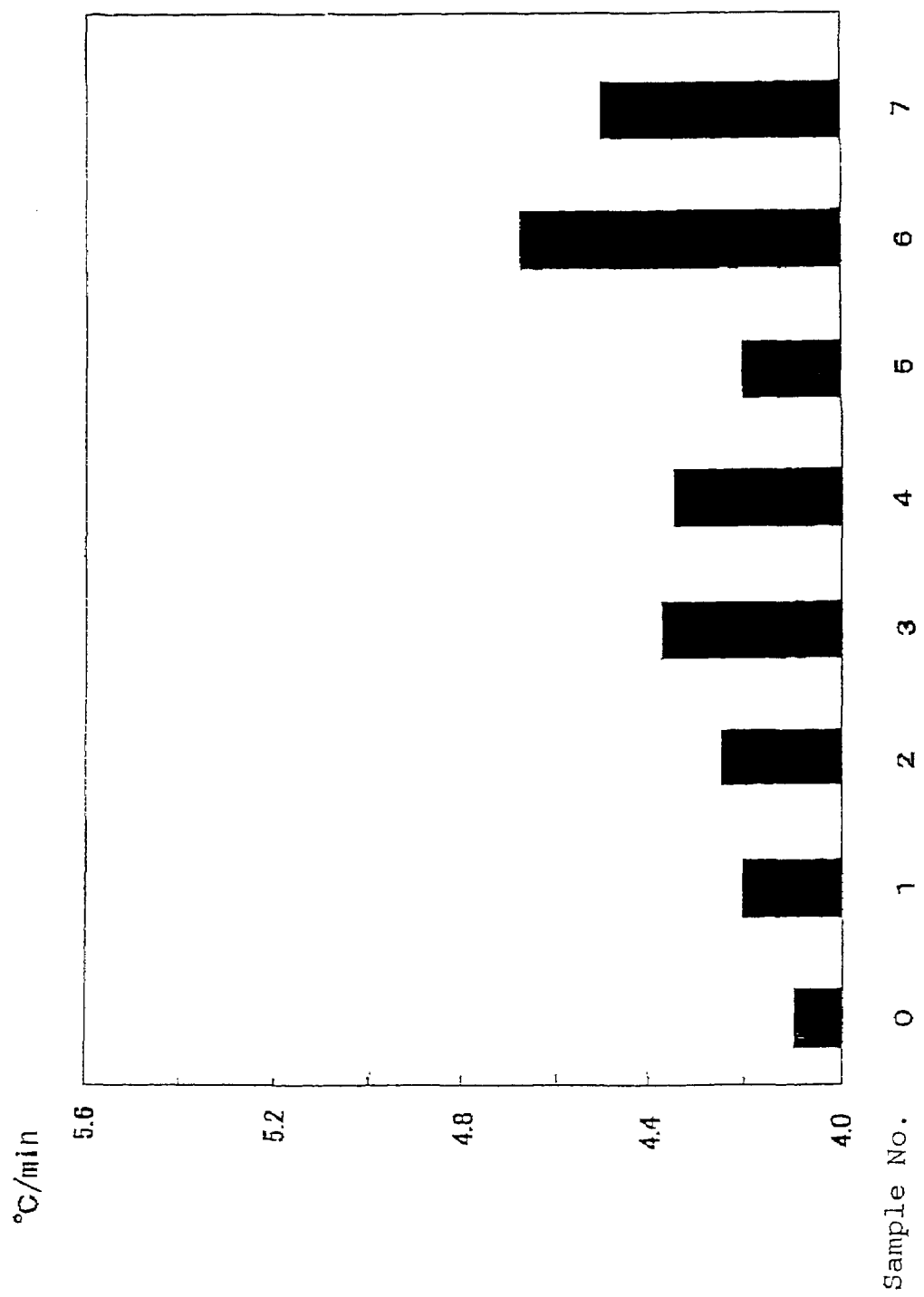
FIG. 2 A graph showing the rate of rise in temperature $S_1$ for samples 0 to 7.

At the same time, the rate of rise in temperature $S_n$ was also measured for each of samples 2 to 7. The results are shown in FIG. 2.

Here, the rate of rise in temperature $S_n$ of sample 0 was set to an energy-saving rate of 0%, and, with respect to each of samples 1 to 7, the rate of rise in temperature and the energy-saving rate compared to that of sample 0 were measured. The energy-saving rate was calculated in accordance with the following formula:

$$\text{Energy-saving rate } \epsilon = (\text{rate of rise in temperature of sample n} - \text{rate of rise in temperature of sample 0})/\text{rate of rise in temperature of sample 0}.$$

The results are as follows:
Sample 1: $S_1$=4.20° C./min, $\epsilon_1$=2.69%.
Sample 2: $S_2$=4.25° C./min, $\epsilon_2$=3.92%.
Sample 3: $S_3$=4.38° C./min, $\epsilon_3$=7.09%.
Sample 4: $S_4$=4.35° C./min, $\epsilon_4$=6.36%.
Sample 5: $S_5$=4.20° C./min, $\epsilon_5$=2.69%.
Sample 6: $S_6$=4.68° C./min, $\epsilon_6$=14.43%.
Sample 7: $S_7$=4.50° C./min, $\epsilon_7$=10.02%.

From the data, the energy-saving rate was 3.92% for tourmaline as a typical substance emitting a far infrared radiation.

Moreover, though tourmaline mixed with silicon (sample 5) has been found to lower the energy-saving rate, tourmaline mixed with carbon (sample 4) has found to enhance the energy-saving rate and, further, tourmaline mixed with iron powder (sample 3) has been found to enhance the energy-saving rate by about 81% as compared to sample 2 with only tourmaline.

Moreover, tourmaline mixed with iron powder and silicon (sample 7) has been found to enhance the energy rate by up to 10.02% as compared to sample 1 with only tourmaline and to enhance the energy-saving rate about 2.56 times as much as compared to sample 2 with only tourmaline.

Further, tourmaline mixed with iron powder and carbon (sample 6) has been found to enhance the energy rate by up to 14.43% as compared to sample 1 with only tourmaline and to enhance the energy-saving rate about times as much as compared to sample 2 with only tourmaline.

Furthermore, the total quantity of heat generation at combustion of fuel is a sum of an effective utilization heat quantity available for the proper purpose of a combustor and a loss with exhaust gas or a heat loss to the environment, or the like, i.e. an ineffective heat quantity unavailable for the proper purpose of the combustor.

Here, when the combustion temperature is enhanced, particularly the loss with exhaust gas decreases because fuel discharged as exhaust gas is burned.

In this respect, the rate of rise in temperature for each of samples 3, 6 and 7 is greater than that for samples 1, 2, 4 and 5. This means that samples 3, 6 and 7 reach a high temperature quickly and their maximum temperatures are higher compared to samples 1, 2, 4 and 5.

Therefore, thermal efficiency at combustion can be enhanced since a part of the ineffective heat quantity as a loss with exhaust gas can be used as an effective heat quantity.

Further, the most efficient sample among the above combinations was sample 6.

The second example of the present invention will be described below.

The following experiments were conducted.
Fuel used: city gas (13A)

CH$_4$: 88.0%
C$_2$H$_6$: 5.8%
C$_3$H$_8$: 4.5%
C$_4$H$_{10}$: 1.7%
Flame type: jet diffusion flame
Flow rate of fuel: 73 cm/s
Flow rate of air: 27 cm/s
Initial conditions: room temperature, atmospheric pressure (0.1 MPa)

Figure 3:
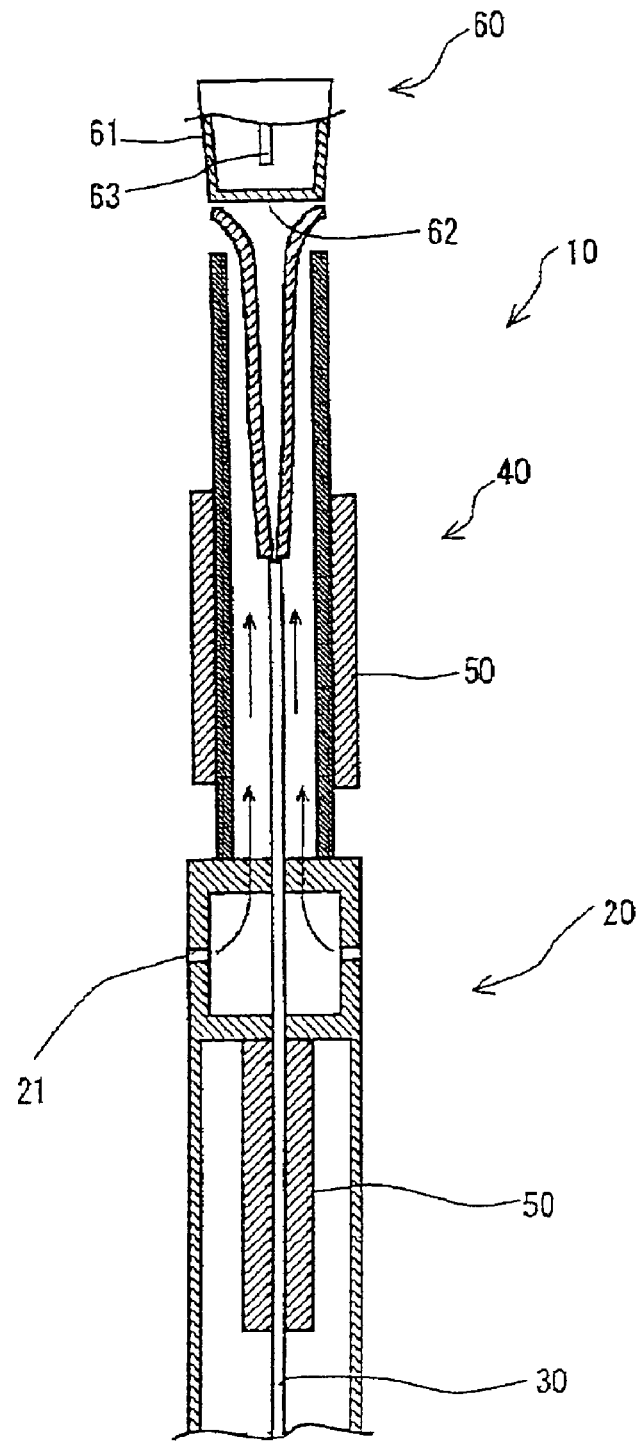
FIG. 3 A schematic diagram of a temperature-rise-measuring apparatus used in the second example.

A rise in temperature was measured by a measuring apparatus 10 shown in FIG. 3 under the conditions described above.

The measuring apparatus 10 comprises a joint section 20, a fuel pipe 30 fixed on the joint section 20, and a burner section 40, wherein air holes 21 are provided in the joint section 20, and fuel from the fuel pipe 30 protruding into the burner section 40 and air from the air holes 21 are mixed together to be burnt in the burner section 40.

Moreover, a far infrared radiator 50 is mounted just before the fuel pipe 30 and the combustion part of the methane gas passage of the burner section 40.

Here, the burner section 40 comprises a stainless pipe having an outer diameter of 80φ and an inner diameter of 60φ, wherein a distance between the joint section 20 and the leading end of the fuel pipe 30 is 130 mm and a distance between the joint section 20 and the leading end of the far infrared radiator 50 is 150 mm.

Then, at a position that the combustion flame in the burner reaches is positioned a temperature-rise-measuring apparatus 60. The temperature-rise-measuring apparatus 60 is formed as a cylindrical barrel 61 of 120φ in its entirety, wherein one surface of the barrel 61 is a flame surface 62 contacted by the flame, and a thermocouple 63 is provided away from the flame surface 62 to measure the temperature of an inside of the barrel 61.

Figure 4:
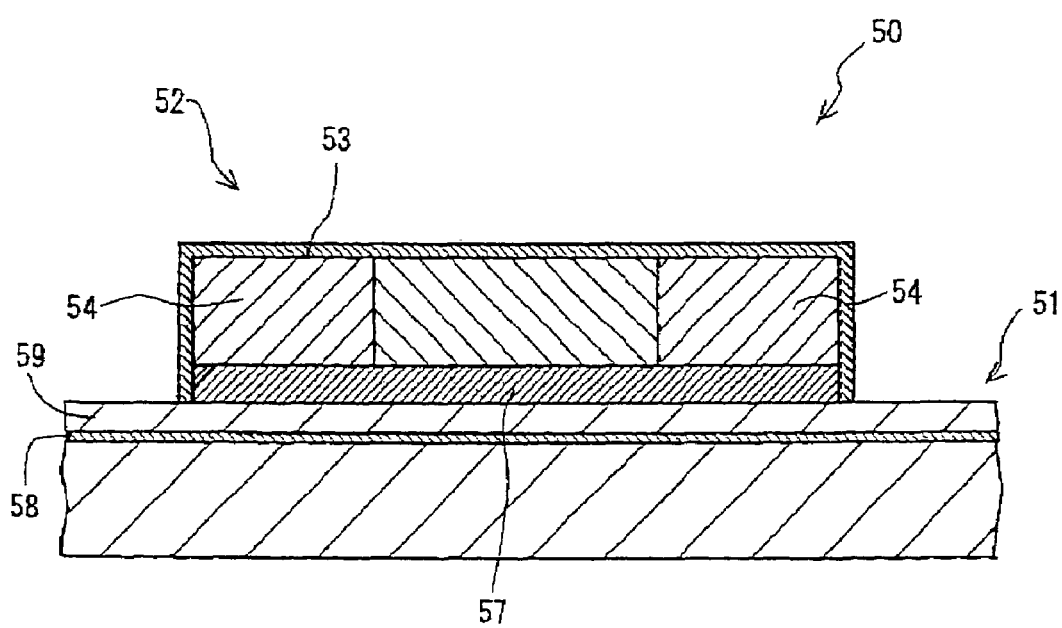
FIG. 4 A detailed view of a far infrared radiator used in the second example.

Moreover, the far infrared radiator 50 comprises an energy-absorbing coating 51 applied to the burner section 40 and an energy radiator 52. Further, as shown in FIG. 4, the energy radiator 52 comprises a plurality of frames including iron block 53 and magnet 54 included in a unit frame and, further, an energy sheet 57 positioned on the magnet 54 side in the unit frame. The magnet 54 used here is of 20 kG (Gauss).

Furthermore, the energy-absorbing coating 51 is used for effectively exerting an electromagnetic wave from energy sheet 57 on methane gas without reflecting at the metallic surface of the burner section 40 and the like, and comprises a primer 58 and a coating 59.

The primer 58 is based on Epora #3000 (manufactured by Nihon Tokushu Toryo Co., Ltd.) of two-liquid-mixture-solidification type which consists of agent A and agent B.

Specifically, 45 g of tourmaline (30 to 35 microns) and 6 g of carbon (powder) are added to 185 g of agent A of the primer 58, and uniformly mixed. When the resultant mixture is added with 110 g of agent B just before the application, it is solidified in about 10 minutes.

The coating 59 is based on Epora #3000 (manufactured by Nihon Tokushu Toryo Co., Ltd.) of two-liquid-mixture-solidification type which consists of agent A and agent B.

Specifically, 112 g of tourmaline (30 to 35 microns) and 12 g of carbon (powder) are added to 80 g of agent A of coating 59, and mixed uniformly. The resultant mixture is added with 200 g of agent B just before the application. Furthermore, 12 g of carbon (powder) may be added to 80 g of agent A and mixed uniformly without mixing tourmaline.

Furthermore, the amounts described above show amounts for application to an area of 600,000 to 750,000 mm$^2$, and the primer 58 has a thickness of about 0.2 mm and the coating 59 has a thickness of about 0.5 mm.

Furthermore, since the primer 58 is required to be adhesive to the metallic surface, the amount of tourmaline and the like is reduced. Moreover, since the coating 59 is poor in adhesion in a monolayer, it has a two-layer structure together with the primer 58.

Moreover, the energy sheet 57 is based on a modified urethane resin (manufactured by Nihon Tokushu Toryo Co., Ltd.) of two-liquid-mixture-solidification type which consists of agent A and agent B.

After 240 g of tourmaline (30 to 35 microns), 418 g of iron (iron powder) and 15 g of carbon (powder) are added to 156 g of agent A of energy sheet 57, they are mixed uniformly. Just before application, 390 g of agent B is added and mixed, and the resultant mixture is poured into a frame with an unwoven fabric positioned in the middle to form a sheet having a thickness of 2 mm at room temperature for 18 hours.

Here, the energy sheet 57 is a combination of tourmaline, iron and carbon, which had the highest energy-saving rate in the first example.

Furthermore, as a resin used for the coating 59 or a resin used for the energy sheet 57, in addition to the resins described above, a conventional synthetic resin can be used when the environment temperature for use is 110° C., and a silicon resin can be used when the temperature exceeds 150° C.

Then, the rise in temperature per unit time of the inside of the barrel 61 was measured for the following samples:

Sample 0: far infrared radiator absent; magnet absent.
Sample 1: far infrared radiator absent; magnet present.
Sample 11: energy sheet absent; energy-absorbing coating present; magnet absent.
Sample 12: energy sheet present; energy-absorbing coating absent; magnet absent.
Sample 13: energy sheet present; energy-absorbing coating absent; magnet present.
Sample 14: energy sheet present; energy-absorbing coating present; magnet present.
Sample 15: energy sheet present; energy-absorbing coating absent; magnet present (the burner section 40, however, was made of iron, not stainless).

Here, the rate of rise in temperature $S_n$ was measured for each of samples 0 and 1.

The results are as follows:
Sample 0: $S_0$=4.09° C./min.
Sample 1: $S_1$=4.20° C./min.

From the results, it has been found that only an addition of the magnet increases the rate of rise in temperature $S_n$.

At the same time, the rate of rise in temperature $S_n$ was also measured for each of samples 11 to 15.

Here, the rate of rise in temperature $S_0$ of sample 0 was set to an energy-saving rate of 0%, and, with respect to each of samples 11 to 15, the rate of rise in temperature and the energy-saving rate compared to that of sample 0 were measured. The energy-saving rate was calculated in accordance with the following formula:

Energy-saving rate $\epsilon$=(rate of rise in temperature of sample n−rate of rise in temperature of sample 0)/rate of rise in temperature of sample 0.

The results are as follows:
Sample 11: $S_1$=4.50° C./min, $\epsilon_1$=10.02%.
Sample 12: $S_2$=4.45° C./min, $\epsilon_2$=8.80%.
Sample 13: $S_3$=4.73° C./min, $\epsilon_3$=15.65%.
Sample 14: $S_4$=5.06° C./min, $\epsilon_4$=23.72%.
Sample 15: $S_5$=4.96° C./min, $\epsilon_5$=21.27%.

From the data, it has been found that, even if the magnet is absent, the energy-saving rate is enhanced by using only the energy sheet (sample 12) or the energy-absorbing coating (sample 11).

Further, it has been found that the enhancement of the energy-saving rate of "magnet present" (sample 13) compared to "magnet absent" (sample 12) for the case of "energy sheet present; energy-absorbing coating absent" is greater than the enhancement of the energy-saving rate between sample 0 and sample 1.

Further, sample 14 of "energy sheet present; energy-absorbing coating present; magnet present" had the highest energy saving rate.

Furthermore, sample 15 has an enhanced energy-saving rate compared to sample 13. This is considered to be attributable to lower reflections of electromagnetic waves from the energy sheet at the metallic surface when the burner section 40 is made of iron than that when made of stainless since none of samples 13 and 15 uses the energy-absorbing coating.

The third example of the present invention will be described below.

The third example is intended for obtaining an optimum energy sheet in terms of spectral emissivity.

Methane gas has a large absorption band for electromagnetic wave radiation energy at a wave number of about 1200 $cm^{-1}$.

Then, by giving a wavelength at such a wave number to methane gas, the rotational and vibratory motions of methane molecules as well as active chemical species as a combustion precursor emanating from methane molecules can be more vigorously accelerated to induce a rise in flame temperature.

Thus, a material having a high spectral emissivity in the wave number range around 1200 $cm^{-1}$ described above is suitable for the material of far infrared radiator 50.

Then, energy sheets with the amounts of materials varied as described below were fabricated mainly using the energy sheet of the material composition in the second example, and the spectral emissivity was measured.

Furthermore, the spectral emissivity was determined by representing the spectral emissivity of each material as a percentage when the spectral emissivity of a black-body paint was 94%, and converting the spectral emissivity in the wave number of 1200 $cm^{-1}$ into a value at 100° C. Moreover, tourmaline in the form of powder of 30 to 35 microns, iron in the form of iron powder, and carbon in the form of powder were used.

Sample 20: resin 546 g, tourmaline 240 g, iron 334 g, carbon 15 g.
Sample 21: resin 546 g, tourmaline 240 g, iron 418 g, carbon 15 g.
Sample 22: resin 546 g, tourmaline 240 g, iron 502 g, carbon 15 g.
Sample 23: resin 546 g, tourmaline 192 g, iron 418 g, carbon 15 g.
Sample 24: resin 546 g, tourmaline 288 g, iron 418 g, carbon 15 μg.
Sample 25: resin 546 g, tourmaline 240 g, iron 418 g, carbon 7.5 g.
Sample 26: resin 546 g, tourmaline 240 g, iron 418 g, carbon 22.5 g.
Sample 27: resin 546 g, tourmaline 240 g, iron 418 g, carbon 4 g.
Sample 28: resin 546 g, tourmaline 240 g, iron 418 g, carbon 2 g.
Sample 29: resin 546 g, tourmaline 240 g, iron 200 g, carbon 7.5 g.
Sample 30: resin 546 g, tourmaline 240 g, iron 600 g, carbon 7.5 g.
Sample 31: resin 546 g, tourmaline 240 g, iron 418 g, carbon 0 g.
Sample 32: resin 546 g, tourmaline 500 g, iron 418 g, carbon 15 g.

The spectral emissivity of each sample was as follows:
Sample 20: 84.9%.
Sample 21: 84.9%.
Sample 22: 84.5%.
Sample 23: 75.9%.
Sample 24: 61.4%.
Sample 25: 94.0%.
Sample 26: 85.2%.
Sample 27: 93.5%.
Sample 28: 91.4%.
Sample 29: 81.9%.
Sample 30: 77.1%.
Sample 31: 78.9%.
Sample 32: 81.7%.

From the results described above, the following findings have been obtained.

(1) As to carbon, sample 21 contained 15 g of carbon, while samples 31, 28, 27, 25 and 26 were prepared so as to contain 0 g, 2 g, 4 g, 7.5 g and 22.5 g of carbon, respectively. It has been found that it is desirable to add carbon in light of a comparison of sample 31 with sample 28.

Moreover, it has been found that for setting the spectral emissivity to 90% or more, it is necessary to add about 1 g of carbon, and for its upper limit, it is possible to add up to about 12 g of carbon.

Moreover, it has been found that the optimum value is about 7.5 g in light of the spectral emissivity.

(2) As to iron, sample 21 contained 418 g of iron, while samples 29, 20, 22 and 30 were prepared so as to contain 200 g, 334 g, 502 g and 600 g of iron, respectively. Moreover, the amounts of other materials in samples 20 and 22 are the same. Further, samples 29 and 30 were prepared so as to contain carbon in an amount of 7.5 g, the optical value in section (1) while containing a fixed amount of tourmaline.

Here, it has been found that sample 30 containing 600 g of iron has a spectral emissivity in the order of "70%," and all other samples have a spectral emissivity greater than "80%."

Moreover, it has been found that for setting the spectral emissivity to 90% or more, it is desirable to add iron in an amount of about 300 to 450 g when the amount of carbon is 7.5 g, i.e. the optimum value.

(3) As to tourmaline, sample 21 contained 240 g of tourmaline, while samples 23, 24 and 32 were prepared so as to contain 192 g, 288 g and 500 g of tourmaline, respectively. Moreover, the amounts of other materials in samples 21, 23, 24 and 32 are the same.

As a result, the spectral emissivity of sample 21 is as high as "84.9%," sample 23 has a spectral emissivity of "75.9%," sample 32 has a spectral emissivity of "81.7%" and sample 24 has a spectral emissivity of "61.4%."

Therefore, it has been found that for tourmaline, the optimum value is about 240 g in sample 21.

Moreover, as a result of conducting experiments with the amount of carbon set to the optimum value of 7.5 g, it has been confirmed that for setting the spectral emissivity to 90% or more, tourmaline can be used in an amount of up to about 175 to 600 g.

Comprehensive evaluations of examples 1 to 3 described above have showed that it is preferable to use an energy sheet prepared by dispersing and fixing a mixture of tourmaline, carbon and iron in a resin.

Moreover, concerning the amount, it is preferable that the amount of tourmaline should be about 175 to 600 g, the amount of carbon should be about 1 to 12 g and the amount of iron should be about 300 to 450 g.

Further, the best combustion effect is exhibited when the energy-absorbing coating is applied and the magnet is used in addition to use of the energy sheet.

INDUSTRIAL APPLICABILITY

The present invention relates to a fuel activation apparatus for methane gas, which can be used in combustion appliances such as boilers, generators and the like, and engines, and for fuel itself, either gaseous fuel or liquid fuel can be used as long as it can be burnt in the form of methane gas.

The invention claimed is:

1. A fuel activation apparatus for methane gas, there being positioned a far infrared radiator produced by mixing 300 to 450 weight part of iron powder and 1 to 12 weight part of carbon with 175 to 600 weight part of tourmaline in a passage of methane gas just before its combustion part.

2. The fuel activation apparatus for methane gas according to claim 1, wherein silicon is further mixed with the far infrared radiator.

3. The fuel activation apparatus for methane gas according to claim 1, wherein a magnet is placed on the circumference of the far infrared radiator.

4. The fuel activation apparatus for methane gas according to claim 2, wherein a magnet is placed on the circumference of the far infrared radiator.

5. A fuel activation apparatus for methane gas, there being positioned, in a passage of methane gas just before its combustion part, an energy-absorbing coating comprising a primer formed as a mixture of tourmaline and carbon with resin applied to the passage and a coating formed as a mixture of tourmaline and carbon with resin applied to an outer surface of the primer, and that there is positioned, around the energy-absorbing coating, a far infrared radiator comprising an energy sheet formed as a mixture of tourmaline, iron powder and carbon with resin and a magnet.

6. The fuel activation apparatus for methane gas according to claim 5, wherein a combustion part is included as the methane gas passage.

* * * * *